Dec. 25, 1934.  S. C. CLARK  1,985,484
MAT OR COVERING AND METHOD OF MAKING SAME
Filed April 27, 1932
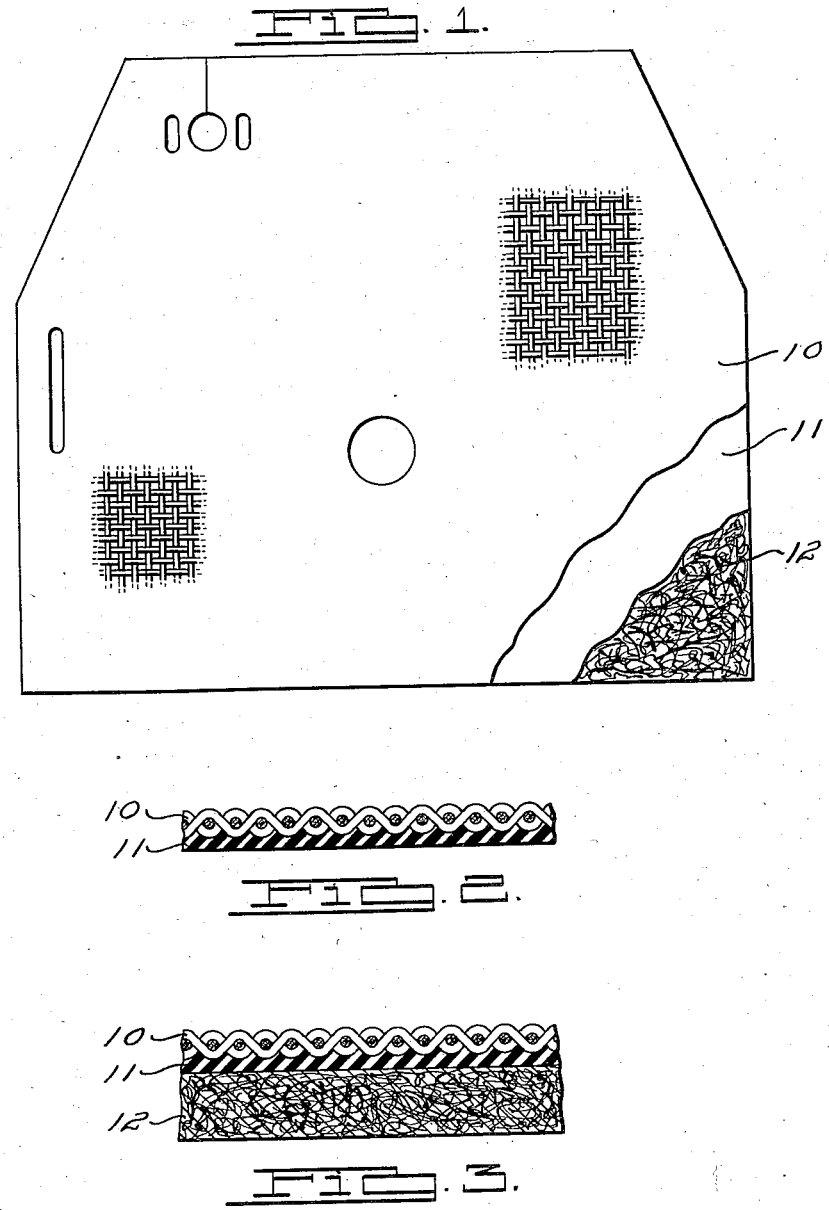
INVENTOR
Samuel C. Clark.
BY
ATTORNEYS.

Patented Dec. 25, 1934

1,985,484

UNITED STATES PATENT OFFICE 1,985,484

MAT OR COVERING AND METHOD OF MAKING SAME

Samuel C. Clark, Pontiac, Mich., assignor to Baldwin Rubber Company, a corporation of Michigan Application April 27, 1932, Serial No. 607,817

9 Claims. (Cl. 154—2)

This invention relates to coverings and more particularly to coverings for use as floor mats, stair treads or runners and for any other purpose where a relatively thick and resilient surface covering is desirable.

An object of the invention is to provide a strong, resilient covering possessing great wearing qualities and one composed of a plurality of securely bonded layers of material having different physical properties.

This invention is principally concerned with the impregnation and provision of wear resisting qualities in a woven material such as carpet for flooring.

Many objects and advantages of this invention will readily become apparent throughout a reading of the following detailed description and accompanying drawing, in which:

Figure 1 is a plan view of an automobile floor mat, which is one of the uses to which the covering of this invention may be applied, portions broken away to illustrate the successive sheets of which it is composed;

Fig. 2 is an enlarged cross-sectional view of one form of covering of this invention, and Fig. 3 is an enlarged cross-sectional view of a modified form of covering of this invention.

This invention contemplates the impregnation, reinforcement and adaptation of woven material such as carpet or other material of rug-like weave having a pile and nap. The first step in composing a covering in accordance with this invention is the impregnation of woven carpet 10 with rubber or other vulcanizable material which is accomplished by immersing the woven material or carpet in a solution of rubber, latex or other suitable vulcanizable material with which the woven carpet may become impregnated or saturated. This may be accomplished by immersion of the material in a vat containing the solution and passing the woven carpet through a pair of rollers as it is removed from the vat to squeeze out some of the solution prior to its passage from the vat. The copending application of Herman M. Koelliker, Serial No. 578,051, filed November 30, 1931, discloses a method of impregnation which may be utilized in impregnating the woven carpet. The liquid solution may also be applied to the woven carpet 10 by spraying one or both sides, if desired.

The impregnated woven carpet 10 is next bonded to a sheet of rubber 11 which may be approximately 95 to 100 gauge in thickness by vulcanization or other bonding methods. A completed covering in accordance with this invention as above described is shown in Fig. 2 and may be used in that form, the rubber forming a wear-resisting, air-tight and water-proof backing for the woven carpet.

In the form of this invention shown in Fig. 3 the completed covering shown in Fig. 2 is bonded to a layer of resilient fibrous material 12, such as jute, for example. The layer of fibrous material 12 is bonded to the surface of the layer of rubber 11 opposite the surface to which the woven material 10 is bonded.

The layer of fibrous material 12 is preferably pretreated before application to the covering by spraying one or both sides with a solution of latex which serves as a binder to hold the fibrous material intact. The layer of fibrous material 12 is cemented to the surface of the layer of rubber 11.

The layer of resilient fibrous material 14 supplies the quality of great resiliency to the covering and is intended to be the backing or bottom layer of the covering, the woven carpet layer 10 being intended to be used as the tread surface. The layer 12, which is usually of jute, forms a soft and easily compressible backing, and the bonding of the three layers of material together makes the covering a permanent and durable one.

While, for the purpose of illustration, only two forms and a single application of the invention has been disclosed herein in detail, it will be apparent to those skilled in the art that the invention is not so limited but may be embraced in numerous forms, applications and processes all within the terms or the breadth of construction of the appended claims.

I claim:

1. A floor covering comprising a layer of rubber having a tread layer of rubber impregnated woven material bonded to one surface thereof and a layer of fibrous material bonded to the other surface.

2. A floor covering comprising a layer of solid rubber, having a tread layer of rubber impregnated woven material bonded to one surface thereof and a layer of fibrous material impregnated with a binder bonded to the other surface thereof.

3. A floor covering composed of three layers of material bonded together, the top layer being a rubber impregnated woven carpet material, the central layer being a sheet of solid rubber and the bottom layer being a layer of jute which has been impregnated with a suitable binder.

4. A floor covering composed of three layers of material bonded together, the top layer being a rubber impregnated closely woven carpet material, the central layer being a sheet of solid rubber and the bottom layer being a resilient fibrous material.

5. The method of making a floor covering which consists in impregnating a sheet of woven material by immersion in a solution of vulcanizable material, impregnating a sheet of fibrous material by spraying the sides with a solution of binding material and vulcanizing the sheet of woven material to one surface of a sheet of rubber and cementing the sheet of fibrous material to the opposite surface of the sheet of rubber.

6. The method of making a floor covering which consists in impregnating a sheet of woven material by immersion in a solution of vulcanizable material, vulcanizing the sheet of woven material to one surface of a sheet of rubber and cementing a sheet of fibrous material to the opposite surface of the sheet of rubber.

7. The method of making a floor covering which consists in impregnating a sheet of woven material by spraying with a solution of vulcanizable material, impregnating a sheet of fibrous material by spraying the sides with a solution of binding material and vulcanizing the sheet of woven material to one surface of a sheet of rubber and cementing the sheet of fibrous material to the opposite surface of the sheet of rubber.

8. The method of making a floor covering which consists in impregnating a sheet of woven material by spraying with a solution of vulcanizable material, vulcanizing a sheet of woven material to one surface of a sheet of rubber and cementing a sheet of fibrous material to the opposite surface of the sheet of rubber.

9. A floor covering comprising a tread layer of rubber impregnated woven material, an intermediate thin layer of solid rubber bonded to the woven material, and a relatively thick bottom layer of soft fibrous material bonded to the layer of rubber.

SAMUEL C. CLARK.